(12) United States Patent
Lupke et al.

(10) Patent No.: US 11,156,316 B2
(45) Date of Patent: Oct. 26, 2021

(54) PIPE COUPLING

(71) Applicants: Manfred A. A. Lupke, Thornhill (CA); Stefan A. Lupke, Thornhill (CA)

(72) Inventors: Manfred A. A. Lupke, Thornhill (CA); Stefan A. Lupke, Thornhill (CA)

( * ) Notice: Subject to any disclaimer, the term of this patent is extended or adjusted under 35 U.S.C. 154(b) by 31 days.

(21) Appl. No.: 16/541,378

(22) Filed: Aug. 15, 2019

(65) Prior Publication Data

US 2020/0011462 A1 Jan. 9, 2020

Related U.S. Application Data

(63) Continuation of application No. 15/151,972, filed on May 11, 2016, now abandoned, which is a (Continued)

(30) Foreign Application Priority Data

Mar. 11, 2015 (CA) ..................................... 2884988

(51) Int. Cl.
*F16L 25/00* (2006.01)
*F16L 27/12* (2006.01)

(52) U.S. Cl.
CPC ........... *F16L 25/0063* (2013.01); *F16L 27/12* (2013.01)

(58) Field of Classification Search
CPC ......... F16L 19/06; F16L 17/02; F16L 17/025; F16L 17/06; F16L 25/0036;
(Continued)

(56) References Cited

U.S. PATENT DOCUMENTS 3,998,478 A 12/1976 Zopfi
5,326,138 A 7/1994 Claes et al.
(Continued)

FOREIGN PATENT DOCUMENTS

CA 2411878 A1 5/2004
CN 1361373 A 7/2002
(Continued)

OTHER PUBLICATIONS

Dross, A.; Supplementary European Search Report issued in respect of corresponding European Application No. 16760949.4; search completed Oct. 9, 2018.
(Continued)

*Primary Examiner* — Aaron M Dunwoody
(74) *Attorney, Agent, or Firm* — Cahn & Samuels, LLP

(57) ABSTRACT

A pipe connection used in corrugated pipe includes a male/female connection that is configured to accommodate movement of the male connector in the female connector after installation of the pipe. The ability to maintain a satisfactory pipe connection throughout a desired and designed range of movement is helpful in applications where the pipe may be exposed to changing conditions such as ground settling, ground shifting, earthquake or other conditions. The male connector and the female connector for receiving the male connector are oversized to allow additional insertion of the male connector or partial withdrawal of the male connector while maintaining the pipe connection throughout the range of movement. The pipe connection can also be used to provide an effective two stage male/female connection between reinforced plastic pipe sections.

16 Claims, 9 Drawing Sheets

Related U.S. Application Data continuation of application No. PCT/CA2016/000063, filed on Mar. 11, 2016.

(58) Field of Classification Search
CPC ... F16L 25/0063; F16L 25/0054; F16L 27/12; F16L 21/00; F16L 21/022; F16L 21/035; F16L 47/06; F16L 47/065
USPC ............... 285/148.2, 95, 399, 351, 903, 347
See application file for complete search history.

(56) References Cited

U.S. PATENT DOCUMENTS

| | | | |
|---|---|---|---|
| 5,415,436 | A | 5/1995 | Claes et al. |
| 5,429,398 | A | 7/1995 | Lupke |
| 6,126,209 | A | 10/2000 | Goddard |
| 7,434,850 | B2 | 10/2008 | Duininck et al. |
| 8,820,801 | B2 | 9/2014 | Sutton |
| 2004/0262923 | A1 | 12/2004 | Hegler |
| 2007/0075544 | A1 | 4/2007 | Duininck et al. |
| 2009/0127852 | A1 | 5/2009 | Sutton |
| 2009/0127853 | A1* | 5/2009 | Sutton ................. F16L 25/0036 285/374 |
| 2010/0224306 | A1 | 9/2010 | Sutton et al. |

FOREIGN PATENT DOCUMENTS

| | | |
|---|---|---|
| CN | 202561285 U | 11/2012 |
| CN | 203442375 U | 2/2014 |
| JP | 3336895 B2 | 10/2002 |
| WO | 2010/147887 A2 | 12/2010 |

OTHER PUBLICATIONS

Tse, W.; International Search Report from corresponding PCT Application No. PCT/CA2016/000063; search completed Mar. 31, 2016.

European Patent Office, English abstract for CN1361373 A, printed on Jun. 16, 2021.

Canadian Intellectual Property Office, Examination Report for CA2,884,988, dated Apr. 12, 2021, pp. 1-7.

China National Intellectual Property Administration, Office Action for Chinese App. No 2016800252423, dated Jan. 15, 2020, pp. 1-4.

China National Intellectual Property Administration, English translation of Supplemental Search Report for Chinese App. No. 2016800252423, dated Jul. 15, 2020, p. 1.

European Patent Office, supplementary European Search Report for EPO App. No. 16760949, dated Oct. 18, 2018, pp. 1-6.

European Patent Office, Examination Report for EPO App. No. 16760949, dated May 10, 2021, pp. 1-7.

* cited by examiner

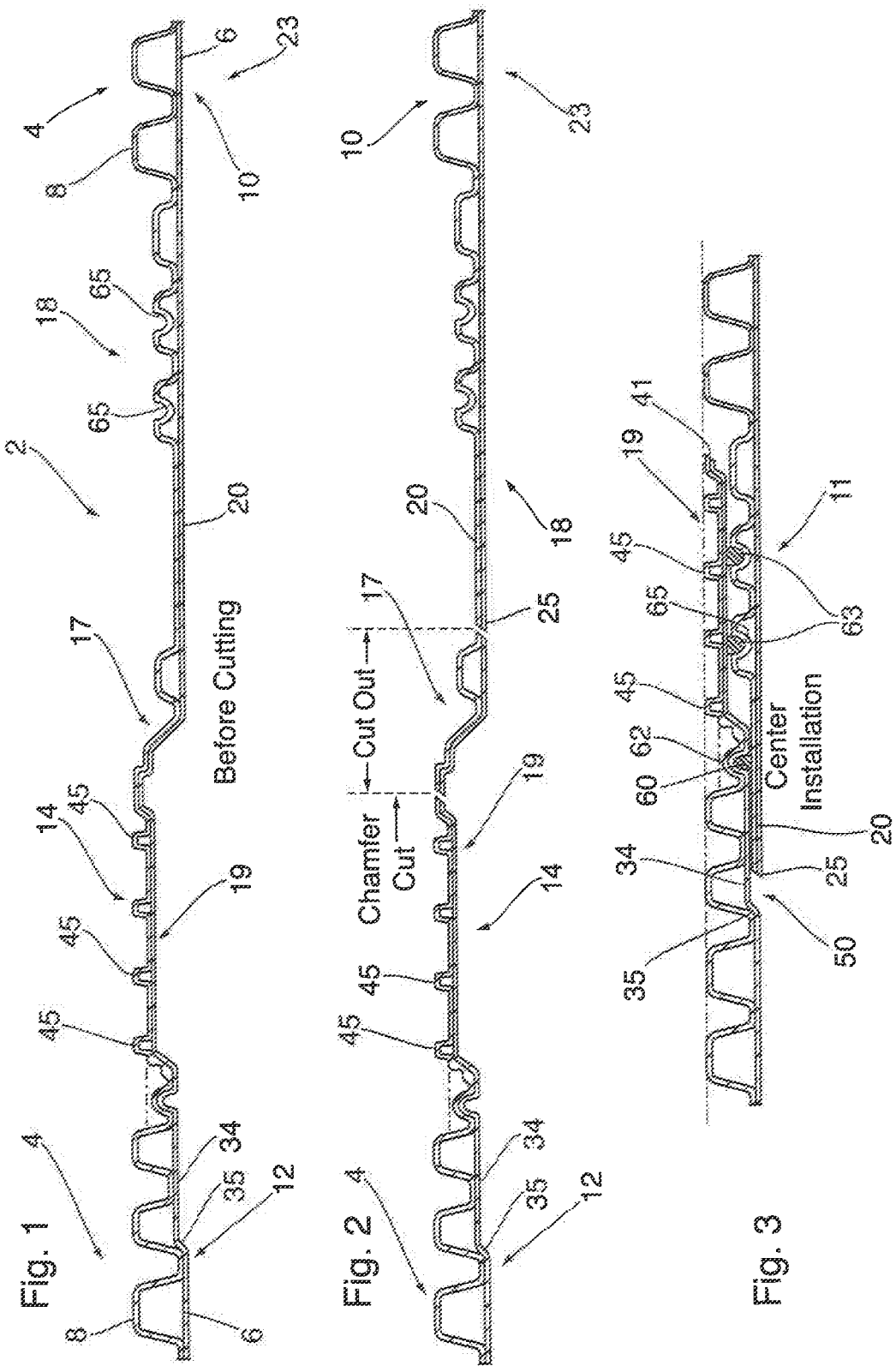

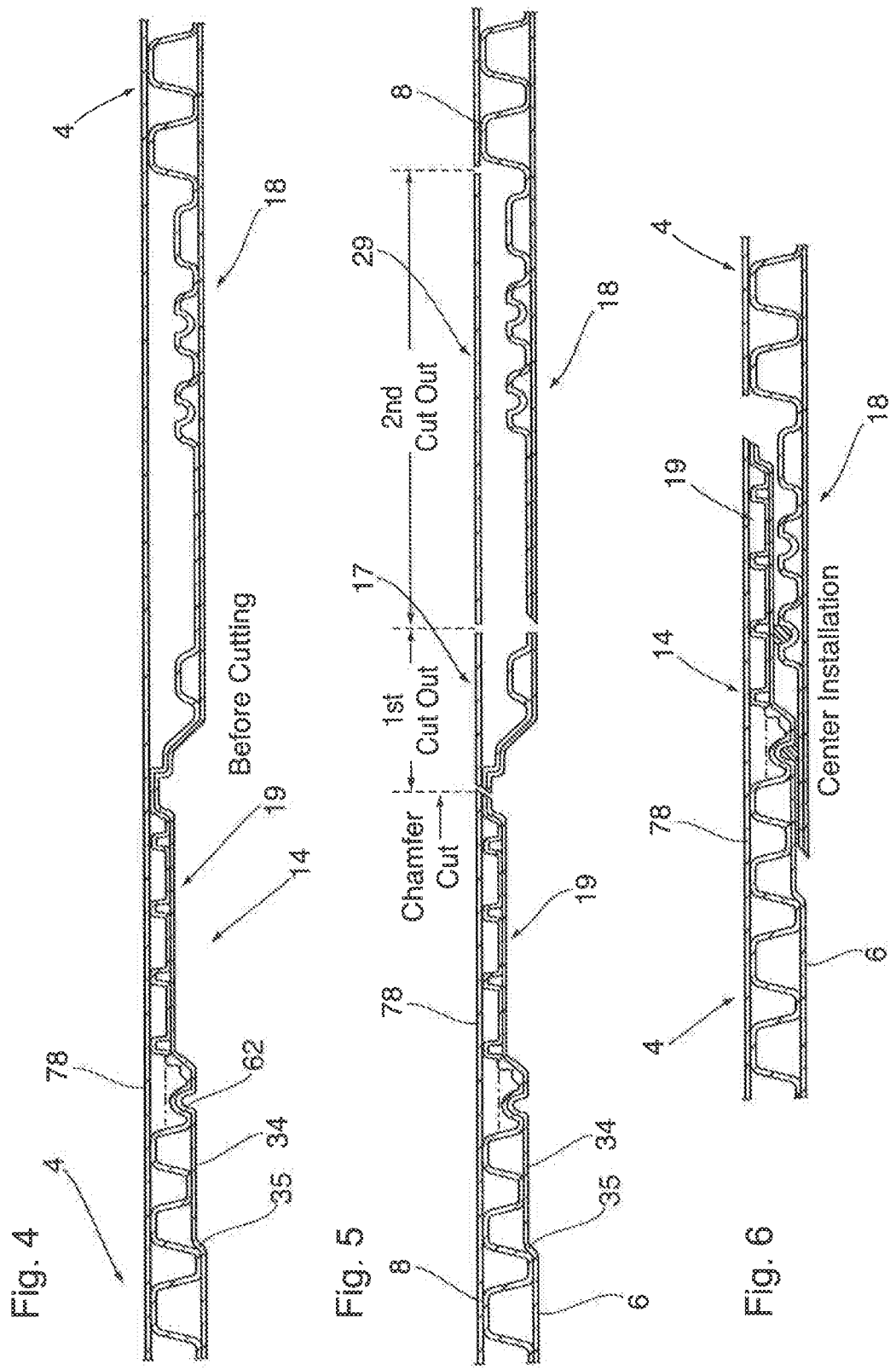

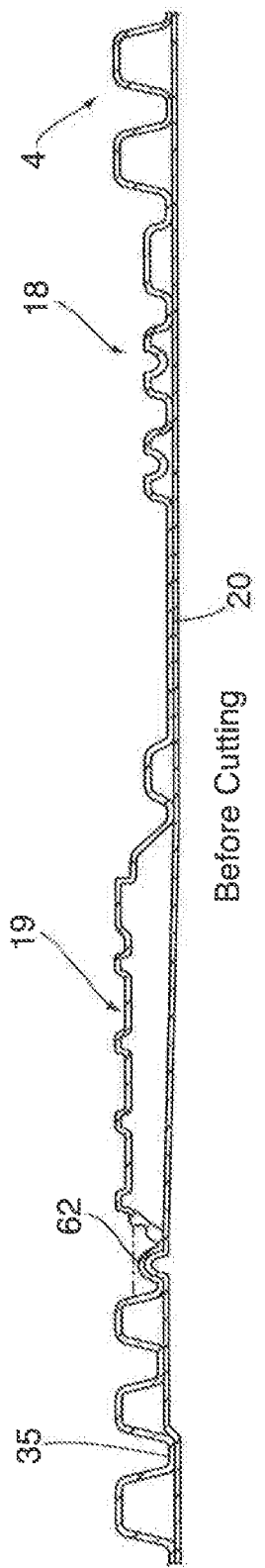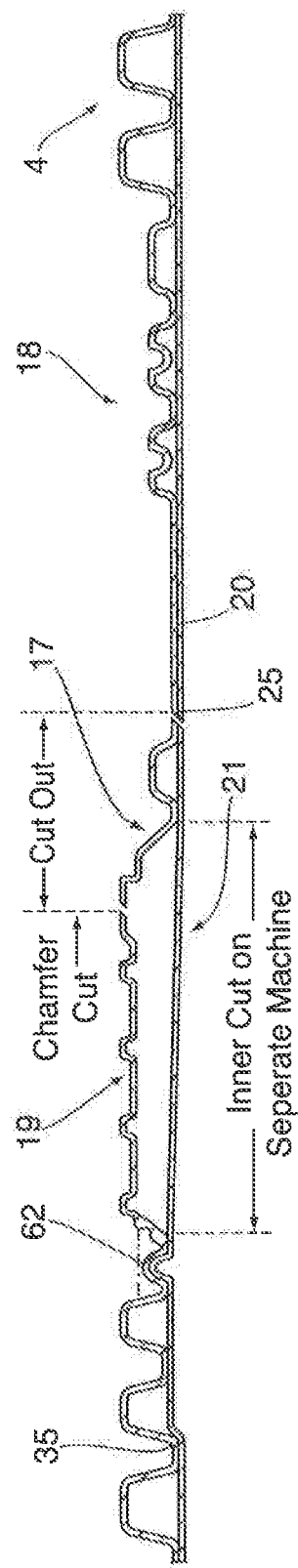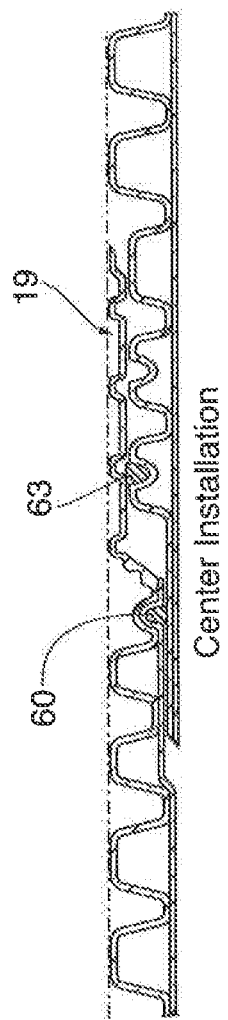

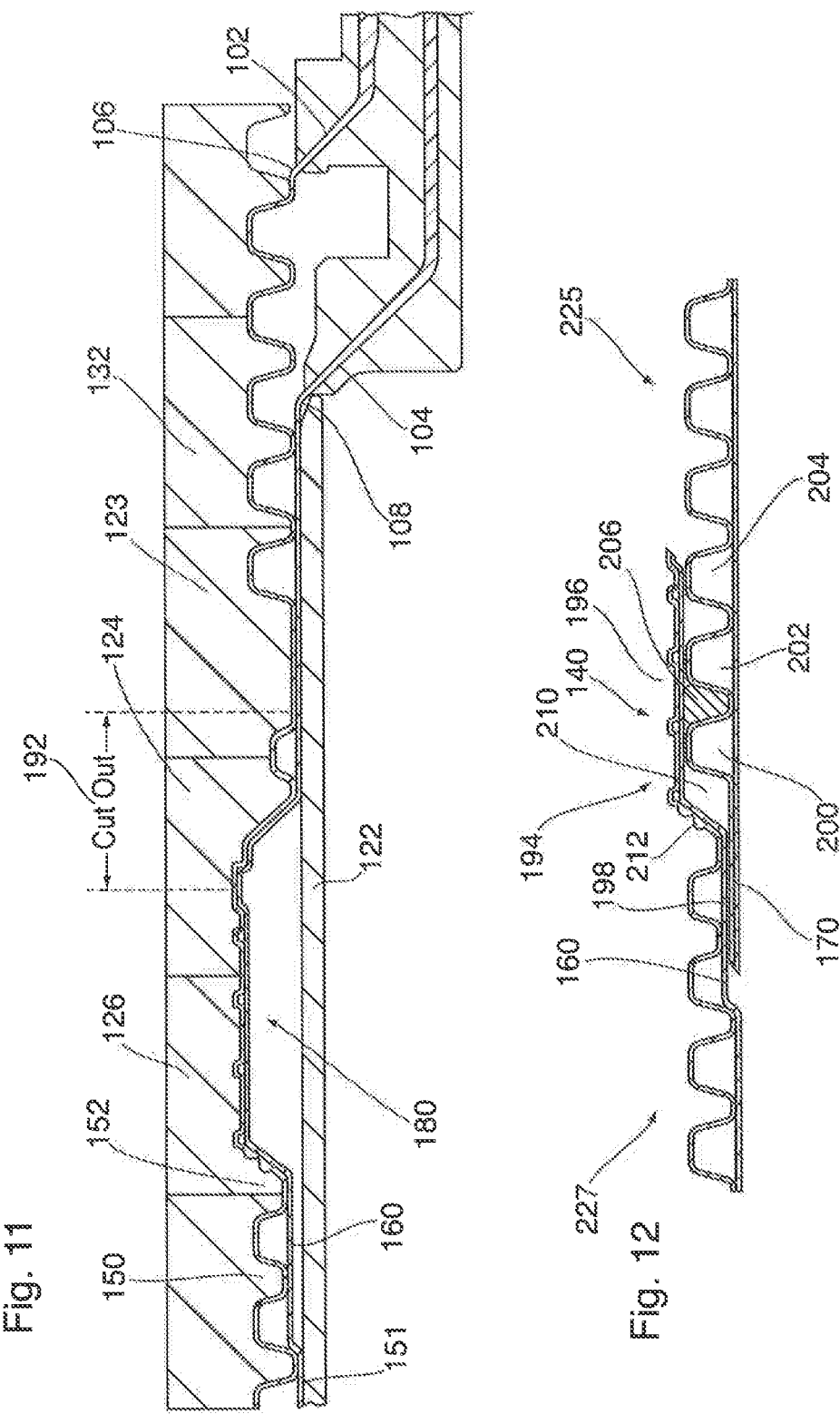

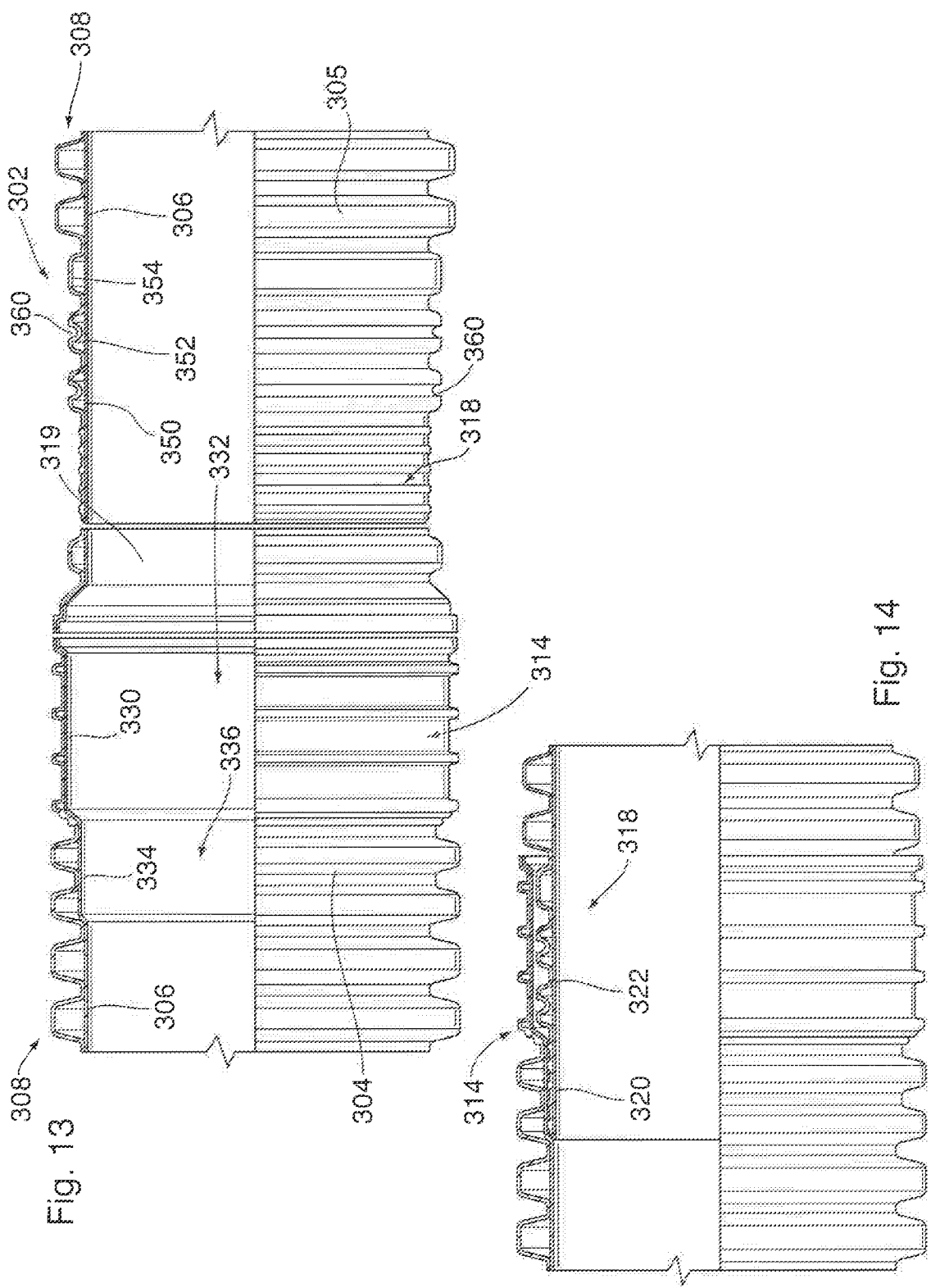

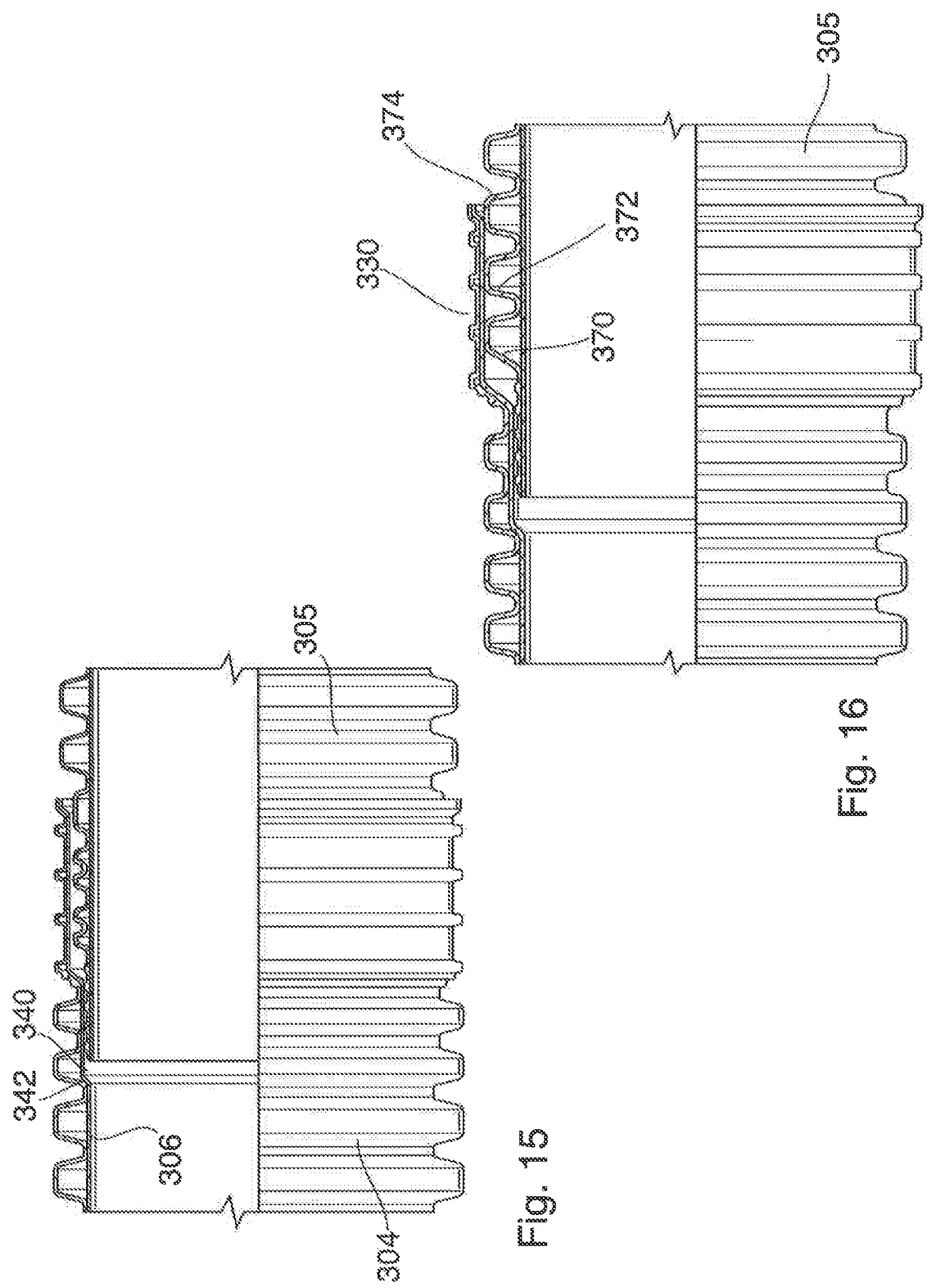

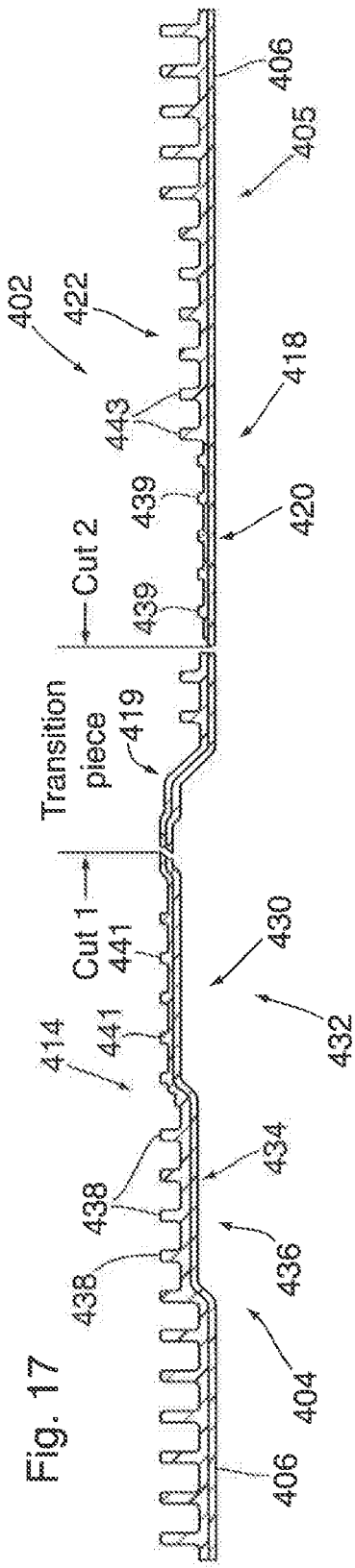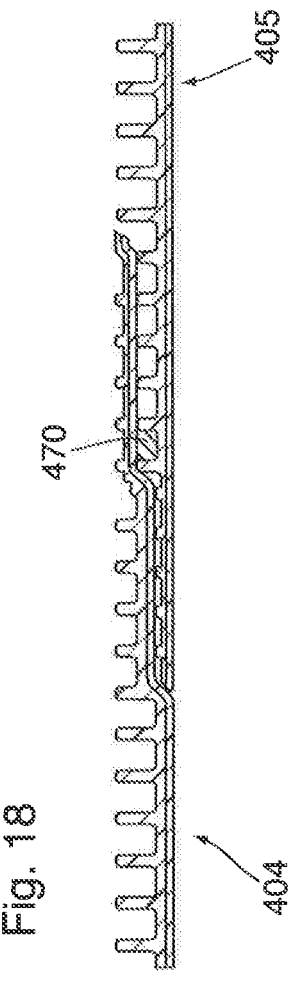

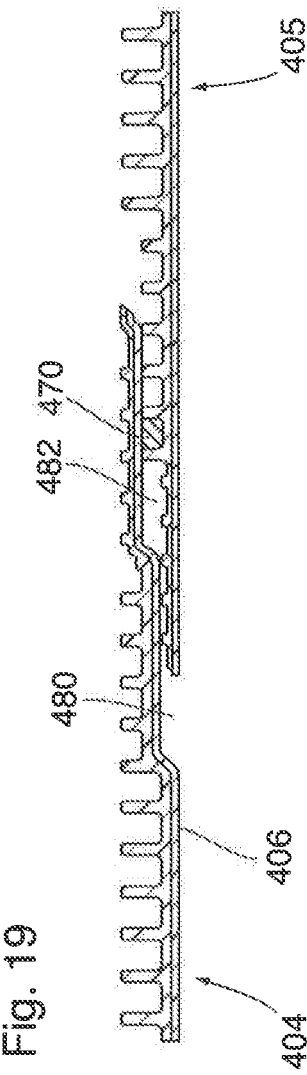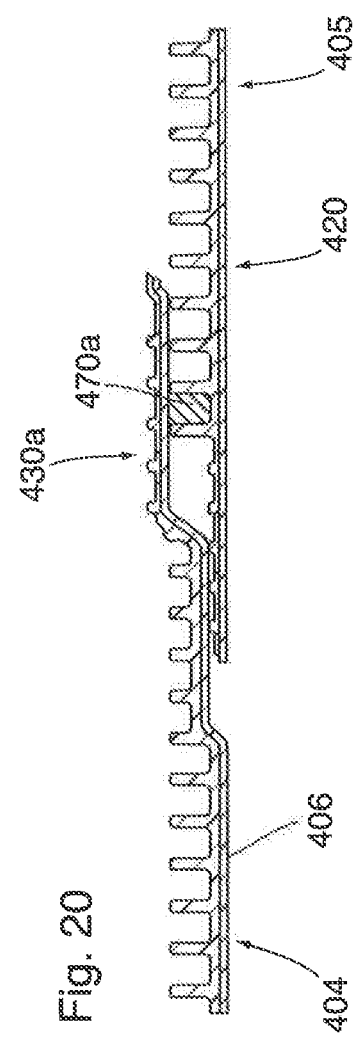

PIPE COUPLING

The present application is a continuation of U.S. patent application Ser. No. 15/151,972, filed on May 11, 2016, which is a continuation of PCT/CA2016/000063, filed on Mar. 1, 2016 and claims priority from Canadian patent application no. 2,884,988, filed on Mar. 11, 2015.

TECHNICAL FIELD

The present application relates to reinforced pipe and in particular to reinforced pipe of a rib or corrugated construction having an improved coupling structure.

BACKGROUND

Double wall corrugated pipe and ribbed pipe are formed to include a male/female connection for connecting two pipe sections. Such corrugated pipe or rib pipe is extensively used in water drainage applications, however it can be used in other applications. Double wall corrugated pipe and reinforced rib pipe are well known. Double wall corrugated pipe is typically manufactured using two streams of extruded plastic with one stream of plastic forming an outer reinforced section and a second stream of plastic forming an inner smooth wall of the pipe. The outer reinforced section of rib and double wall corrugated pipe are connected to the inner smooth wall of the pipe and significantly contribute to the structural properties of the pipe. It is also known to apply a further outer wall connected to the outer reinforcing wall or ribs to form triple wall corrugated or rib pipe.

A male/female connection is used to join pipe sections with each pipe section having a female connector at one end of the pipe section and a male connector at an opposite end of the pipe section. Typically the pipe is manufactured in a continuous process and the pipe sections are cut inline as part of the manufacture process to produce the separate independent pipe sections. Male/female connection mold blocks are appropriately inserted to form these components.

Conventional double wall pipe has the male and female connectors molded as part of the pipe section to form a unitary structure. It is also known to attach injection molded connectors to corrugated pipe sections although this process is more involved and time consuming. The known male/female connectors are designed to have a full insertion of the male connector such that the male connector bottoms out against or is in abutment with a restricting inner surface of the female connector. The structure of the male and female connectors can be quite complex as the overall strength rating of the pipe is often determined by the strength of the pipe connection.

SUMMARY OF THE INVENTION

A reinforced plastic pipe according to the present invention has an inner pipe section of a first inner diameter reinforced by a series of outwardly extending reinforcing portions of a second greater diameter. The outwardly extending reinforcing portions protect and increase the strength of the inner pipe section. An improved male/female connector is provided with one end of said reinforced plastic pipe having a two stage male connector with an opposite end of the reinforced plastic pipe having a two stage female connector sized to receive a male connector of the same construction as the two stage male connector. The male connector comprises a first spigot portion with an inner wall of a first diameter and an outer wall section of a diameter less than an outer diameter of the female connector. The male connector further includes a second spigot portion having an inner diameter the same as the first spigot portion with a plurality of outwardly extending reinforcing members separated by inwardly extending recesses. The female connector at a free end thereof includes a first cuff portion with an inner wall defining an outer connecting cavity sized to receive and engage the second spigot portion and an inner cuff portion defining a smaller cavity merging with the outer cavity and the inner cuff is sized to receive and engage the first spigot portion.

In a preferred aspect of the invention, the first spigot portion is of reduced stiffness relative to the second spigot portion.

In yet a further aspect of the invention, the first cuff portion is of reduced strength relative to the inner cuff portion.

In a further aspect of the invention, a coupling formed by insertion of the male connector in the female connector forms a section of pipe having a stiffness greater than the stiffness of the pipe intermediate the male and female connectors.

In yet a further aspect of the invention, the reinforced plastic pipe includes a series of outwardly extending reinforcing corrugations or outwardly extending reinforcing ribs.

In a further aspect of the invention, the outer diameter of the female connector is the same as the outer diameter of the reinforced pipe.

In a preferred aspect of the invention, the outer diameter of the female connector is slightly larger than the outer diameter of the reinforced pipe.

In a preferred embodiment an outer diameter of the outwardly extending reinforcing members of the male connector are at least approximately equal to an outer diameter of the series of outwardly extending reinforcing portions of the reinforced plastic pipe.

In yet a further aspect of the invention, at least one compressible circumferential sealing member is located on an exterior surface of the second spigot portion and is sized for sealing with a cavity of the size defined by the outer cavity of the female connector.

In a preferred aspect of the invention, the reinforced plastic pipe is formed by an extrusion and molding process where an inner wall of the reinforced plastic pipe is formed from a first stream of extruded plastic and an outer wall of the reinforced plastic pipe is formed by a second stream of extruded plastic.

In a further aspect of the invention, the first spigot section is of a generally constant wall thickness approximately equal to the greatest wall thickness of the inner pipe section between the outwardly extending reinforcing portions.

In yet a further aspect of the invention, the reinforced plastic pipe is a corrugated reinforced plastic pipe with a series of space reinforcing corrugations selectively connected to the inner pipe section and the first spigot portion is of a length at least equal to a length of the reinforced plastic pipe that fully includes two adjacent corrugations of the reinforced plastic pipe at a position intermediate the male/female connectors.

In yet a further preferred aspect of the invention, the second spigot portion is of a length at least equal to a length of the reinforced plastic pipe that fully includes three adjacent corrugations in a section of the reinforced plastic pipe intermediate the male/female connectors.

In a further aspect of the invention a first step is defined between the first spigot portion and a lead corrugation of the second spigot portion and a second step is defined between an inner corrugation of the second spigot portion and an adjacent larger diameter corrugation of the reinforced plastic pipe.

In yet a further aspect of the invention, the first and second steps are approximately equal.

In a further aspect of the invention, the first spigot portion and the cuff portion cooperate along the length thereof to form a sleeve arrangement generally extending the extent of overlap therebetween and the second spigot portion and the first cuff portion form a sleeve arrangement determined by the extent of overlap thereof. These sleeve arrangements are each effective without full insertion of the male connector in the female connector.

In a further aspect of the invention, the two stage male connector cooperates with the two stage female connector to provide two spaced overlap sleeve connecting segments of different diameters with a first sleeve connecting segment defined by the extent of overlap of the first spigot portion with the second cuff portion and a second sleeve connecting segment defined by the extent of overlap of the second spigot portion and the first cuff portion.

In a preferred embodiment of the invention a two stage a male/female connection is used and accommodates limited movement of the male component relative to the female component if required after installation of the pipe. Preferably or alternatively the male/female connection can also accommodate limited additional insertion of the components after installation while maintaining a satisfactory connection. In this embodiment the install position leaves some room for further insertion of the male connector.

In a preferred embodiment, the connecting components have an initial centered position that is used to form the initial connection during pipe installation. With this arrangement the connected pipe sections after installation can accommodate limited inward movement between two connected pipe sections and/or limited partial separation of these components. The advantage of such a connection can be appreciated in installations that may be subject to future ground movement such as ground settling, pipe repair, pipe inspection or other natural events such as earthquakes. The pipe connection has a significant range of movement and a satisfactory connection is provided throughout the range.

In many installations it is preferred to fully insert the male connecting component into the female connector during initial installation to maximize the coupling strength. This installation procedure accommodates limited but significant partial withdrawal if site install conditions change in the future while maintaining a high strength connection.

According to the invention, a male/female connection joins a first double wall pipe section to a second double wall pipe section with the first double wall pipe section having a male connector of the male/female connection and the second double wall pipe section having a female connector of the male/female connection. The male connector includes an elongate spigot and the female connector includes an elongate receiving socket engaging and overlapping with the elongate spigot to form a satisfactory pipe connection between the first and second pipe sections (first stage). The elongate spigot is movable relative to the elongate receiving socket through a range of movement, for example in some installations allowing the elongate spigot to move further into the elongate receiving socket increasing the overlap between the elongate spigot and the elongate receiving socket, and to move outwardly decreasing the overlap between the elongate spigot and the elongate receiving socket while maintaining a satisfactory pipe connection throughout the range of movement.

In an aspect of the invention, the female connector includes a covering cuff that receives an end segment of the first pipe section. The end segment is of a circumference greater than the elongate spigot and is connected to the elongate spigot at an inward end of the elongate spigot. The covering cuff overlaps with the end segment (second stage) and a projecting portion of the elongate spigot extends outwardly from the elongate receiving socket to protect a cavity defined between the end segment and an entrance to the elongate receiving socket that is bound in a radial direction by the covering cuff. The cavity can accommodate movement of the elongate spigot further into the elongate receiving socket and movement of the end segment into the cavity.

In a further aspect of the invention, the elongate spigot is of a length equal to or greater than a length of the first pipe section that includes two corrugations.

In a preferred aspect of the invention, the range of movement is at least 100 mm and preferably the corrugated pipe sections are of a double wall type.

In a preferred aspect of the invention, the covering cuff is of a length to cover any projecting length of the elongate spigot and a portion of the end segment throughout the range of movement.

According to an aspect of the invention, the elongate spigot is of a single wall thickness defined by two layers of connected plastic. Preferably the covering cuff receives corrugations of the first pipe section and is of a length to receive at least 3 corrugations of the first pipe section.

According to a third aspect of the invention, the range of movement is greater than an average spacing between adjacent corrugations of the first pipe section.

The present invention, in a preferred embodiment, is directed to first and second corrugated pipe sections connected by a male connector of the first pipe section received in a female connector of the second pipe section and each pipe section is of at least a double wall configuration having an inner wall defining a tubular passage through the pipe section reinforced by a connected outer corrugated wall attached to the inner wall. The male connector includes an elongate spigot portion forming a thin wall projecting extension of the inner wall of the first pipe section partially received in an outwardly stepped reinforced socket of the second pipe section. The outwardly stepped socket of the second pipe section includes a reinforced inner wall about the spigot portion with a majority of the spigot portion overlapping with the stepped reinforced socket. The stepped reinforced socket is reinforced by a connected corrugated outer wall and the female connection at a free end of the second pipe section includes a cuff portion overlapping with a reinforced corrugated section of the first pipe section that is immediately adjacent the spigot portion and is received in the cuff portion. The first stepped portion at an inner end thereof can extend beyond the spigot portion and the spigot portion at an inner end can extend into the cuff portion to accommodate further inward movement of the spigot portion into the corrugated section of the first pipe section if required. The spigot portion preferably overlaps with the stepped reinforced socket sufficiently to allow partial separation of the spigot portion from the stepped socket if required while maintaining a high strength male/female connection of the pipe sections.

A reinforced plastic pipe section according to a preferred embodiment of the present invention has a generally smooth inner tubular wall and an outer wall defining a first series of reinforcing members attached to and forming a reinforcing structure about the inner tubular wall. The reinforced plastic pipe section has a female connector at one end of the reinforced plastic pipe section and a male connector at an opposite end of the reinforced plastic pipe section. The male connector is of a size for insertion in the female connector. The male connector includes an elongate spigot portion having an inner surface sized to correspond to an inner surface of the smooth inner tubular wall of the reinforced plastic pipe section. The male connector includes at one end of the elongate spigot portion a second series of reinforcing members of a reduced exterior size relative to the first series of reinforcing members. The second series of reinforcing members transition to the first series of reinforcing members at a junction of the male connector and the long reinforced plastic section. The female connector is at a junction between the long reinforced plastic sections and the female connector includes a first stepped portion of a length corresponding to a length of the spigot portion and sized to receive the spigot portion. The first stepped portion merges with and is outwardly stepped relative to the inner tubular wall of the reinforced plastic pipe section. The first stepped portion then merges with an outer cuff of a length and size capable of receiving the second series of reinforcing members.

In an aspect of the invention the outer cuff has an outer edge generally aligned with the outer edge of the reinforced plastic pipe section.

In another aspect of the invention the first stepped portion has a centered position in an axial length of the connection corresponding to an installation initial position of the spigot portion within the female connector. This centered position allows for limited additional inward movement of the spigot portion into the first stepped portion or limited partial withdrawal of the spigot portion from the centered position while maintaining the integrity of the male/female connection between two connected sections of reinforced plastic pipe sections.

According to an aspect of the invention a visual identification arrangement is associated with the male connector or the female connector and provides guidance when connected components are generally in the centered position.

In an aspect of the invention, the reinforcing members are corrugations and the first stepped portion includes a recess seal cavity immediately adjacent to the second stepped portion with the recess seal cavity radially opening into the interior of corrugated pipe section.

According to an aspect of the invention, the recess seal cavity includes a separate wiper seal located therein.

In a preferred aspect of the invention, the second series of corrugations of the male connector include at least one corrugation with a recessed exterior surface forming a wiper seal seat for a separate ring seal.

In an aspect of the invention an end of the spigot portion is spaced from an inner end of the first stepped portion at least 75 mm when the spigot and the first stepped portion are in the centered position.

DESCRIPTION OF DRAWINGS

Preferred embodiments of the invention are shown in the drawings, wherein:

FIG. 1 is a partial side view through one wall of two corrugated pipe sections that are joined by male/female connection components;

FIG. 2 is a view similar to FIG. 1 showing the position of two cuts used to separate the two pipe sections and to form the end of the female connection and the end of the male connection;

FIG. 3 shows the cut pipe sections of FIG. 2 with the male connection inserted into the female connection and with these components located in a centered position;

FIGS. 4, 5 and 6 are similar to FIGS. 1, 2 and 3 however the pipe sections include an outer wall forming a triple wall corrugated pipe and a triple wall cuff of the female connection;

FIGS. 7, 8 and 9 are similar to FIGS. 1, 2 and 3 however in these embodiments the cuff of the female connection is of a single wall thickness;

FIG. 11 is a view similar to FIG. 10 where the mold blocks have advanced; and

FIG. 12 shows the male/female connection in a centered assembled configuration where the cuff connection is slightly greater than the diameter of the corrugated pipe;

FIG. 13 is a partial horizontal cut-away showing an extruded reinforced corrugated pipe at the male/female connector and includes a transition piece that will be cut-away;

FIG. 14 shows the male/female connector of FIG. 13 in a fully inserted position;

FIG. 15 shows the male/female connector of FIG. 13 in a partially inserted coupling position;

FIG. 16 shows a modification of the male/female connector of FIG. 13 where the female connector is of an outer diameter slightly greater than the outer diameter of the reinforced plastic pipe;

FIG. 17 is partial sectional view through a portion of an extruded rib pipe that includes the male/female connector as adapted for the ribbed pipe;

FIG. 18 shows the male/female connector of FIG. 17 in a fully inserted position;

FIG. 19 shows the male/female connector of FIG. 17 in a partially inserted coupling position; and FIG. 20 illustrates a variation of the male/female connector of FIG. 17 where the female connector is of a slightly greater diameter than the reinforced ribbed pipe.

DETAILED DESCRIPTION

Figure 10:
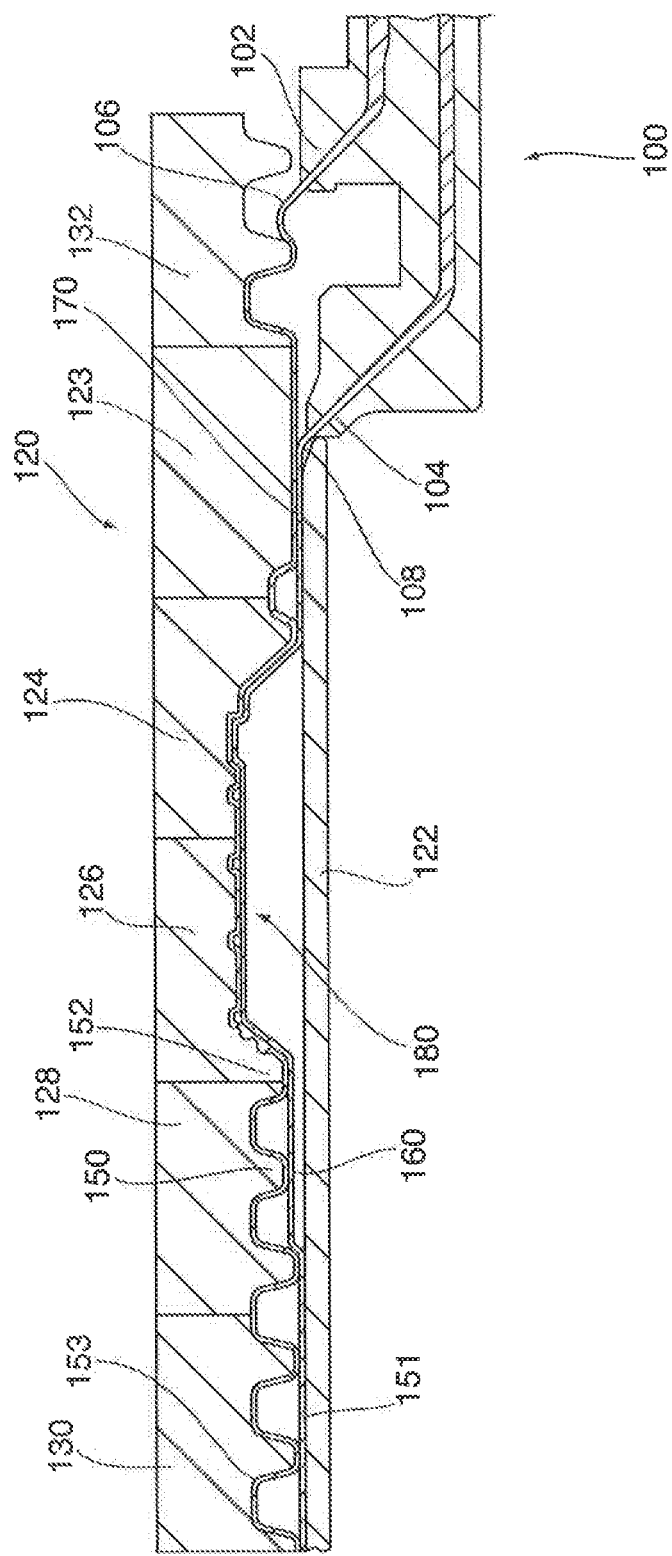
FIG. 10 is a partial sectional view of mold blocks and an extrusion die for forming of the male/female connection of the corrugated pipe.

A continuous length of corrugated pipe 2 is schematically shown in FIG. 1 as manufactured and before cutting into corrugated pipe sections. The corrugated pipe 2 includes two long corrugated pipe sections 4 joined by the formed female connector 14 and male connector 18. The female connector 14 is separated from the male connector 18 by a cut-out portion 17 that is removed and recycled as part of the manufacturing process. The male connector 18 and the female connector 14 are shown in FIG. 3 forming the male/female connection 11.

The corrugated pipe sections 4 preferably each include a smooth inner wall 6 and an outer corrugated wall 8 formed by a first series of corrugations 10, The first series of corrugations 10 at an inner edge merge and connect with the smooth inner wall 6. The female connector 14 is provided at the first end 12 of the first pipe section. The male connector 18 is provided at the second end 23 of the following pipe section. Preferably each pipe section 4 includes a female connector at one end and a male connector at an opposite end of a unitary construction.

The female connector 14 and the male connector 18 are preferably configured to accommodate a limited range of movement of the male connector within the female connector after the pipe has been installed while maintaining a satisfactory connection. Preferably the male and female connectors, as will be described with respect to FIG. 3, have a centered position which is easily recognized during initial installation of the corrugated pipe sections. It is desirable with respect to the flow characteristics of the connected pipe sections for many applications that the connected pipe provide a generally smooth interior surface for the fluid to flow through the pipe connection. Previously the male/female connection has a male connector fully received in a female connector to define an installed position where the end of the male connector is in abutment with an inner surface of the female connector such that further inward movement of the male connector is not possible. In addition in the prior art structures partial withdrawal of the male connector may present a significant gap causing fluid flow disturbance and/or seal problems and in most cases loss of the designed structural integrity of the connection.

The present invention uses a male connector having an extended spigot 20 that is received within an oversized in length first stepped portion 34 of the female connector. As shown in the preferred initial install position, the male/female components are installed in the centered position of FIG. 3. The spigot portion 20 is spaced from and not in abutment with an inner end face of the female connector. A shallow recess or gap 50 is provided between the end 25 of the elongate spigot 20 and inner end 35 of the first stepped portion 34. The first stepped portion 34 and the elongate spigot 20 are each of a length to provide a substantial overlap in all positions within a designed range of movement. The elongate spigot is able to move in the length of the first stepped portion 34 while maintaining sufficient overlap to maintain the structural integrity of the male/female connection. The elongate spigot is of a relatively thin wall thickness to keep the gap 50 shallow.

It can be seen in FIG. 3 that gap 50 allows for limited inward movement of the elongate spigot 20 along the first stepped portion 34 before any abutment of the components occurs (one end of the range of movement). The spigot portion is separated from the inner end 35 of the first stepped portion a desired distance that may vary depending upon the size of the pipe. For example a 75 to 125 mm range of movement in either direction can be provided when the elongate spigot is in the centered position as shown in FIG. 3. Similarly the overlap of the first step portion and the elongate spigot 20 is preferably of a length to accommodate partial withdrawal of the spigot portion a similar distance while still maintaining an effective overlap of the spigot portion with the first stepped portion. It is apparent from the above description that this range of movement could be in one direction only or in a non-equal distribution.

These components can be designed to accommodate a specified movement and the limits of 75 mm to 125 mm are provided as an illustration that may be used as a common design requirement but the present invention is not limited to this range. The range of movement is a design parameter and can be varied depending upon the application, pipe size, and other criteria.

In the embodiment shown in FIG. 3, seal 60 is provided in a recess 62 of the first stepped portion. This ring type seal can be used to provide partial sealing between the first stepped portion and the spigot portion, and it can also be used to provide an indication with respect to whether the spigot portion has been centered in the appropriate initial installation position relative to the first stepped portion 34. For illustration purposes two further seals 63 are shown however seals 63 are normally an alternative to seal 62. Seals 63 are in recesses 65 of the first two corrugations however one or more seals could be in the gaps between corrugations received in the cuff 19 of the female connector 14. Sealing as part of the second spigot portion is preferred and simplifies the shape of the first spigot portion.

The centered position can be indicated by alignment of certain surfaces and/or a physical neutral bias can be provided at the centered position. Various known approaches can be used to indicate a desired relative position of components. The preferred or recommended installation is based on a flow direction and this flow direction would be from right to left in FIG. 3.

With respect to identifying a centered position it can be appreciated that the free end 41 of the second stepped portion 40 can be used in combination with one of the second series of corrugations 22 of the male connection 18 to identify the desired position. One of these corrugations can include a mark used to align the end 41 with that particular corrugation to indicate that the spigot portion has been appropriately centered.

The second series of corrugations can also include recessed portions 65 in the exterior surface to receive a ring seal member such as 63.

With the male/female connection in the centered position of FIG. 3, the two connected corrugated sections are joined in an end to end manner by the male connector of one pipe section inserted in the female connector of the other pipe section generally in the desired centered position. This connection allows for limited inward movement of the elongate spigot in a compressive type displacement or partial withdrawal of the elongate spigot while still maintaining the integrity of the male/female connection. The amount of movement accommodated is a design feature of the male/female connection and may vary with particular applications. One effective range is at least 75 mm in either direction from the centered position. The actual distance accommodated is a function of the overlap and length of the spigot portion and the first stepped portion. Given that the spigot portion 20 is preferably of a double wall thickness, and the cuff in the area of the first stepped portion 34 includes both an inner wall and a corrugated outer wall, the strength of the male/female connection is quite high throughout the range. Similarly, the strength of the male/female connection between the second stepped portion and the second series of corrugations 22 of the male connector also provides a high strength connection similar to the overall strength of the corrugated pipe. In FIG. 3 it can be seen a range of movement at least equal to the distance between adjacent corrugations of the pipe between the couplers is easily accommodated. Increasing the length of the coupling and providing two distinct sleeve portions reduces deflection perpendicular to the axis of the coupling.

FIGS. 1 through 3 show a double layer cuff 19 of a double wall thickness and can include its own small corrugations 45.

FIGS. 4, 5 and 6 are similar to FIGS. 1 through 3 and shown an alternate embodiment where the corrugated pipe, rather than being double wall corrugated pipe, is triple wall corrugated pipe. The cuff 19 again includes the first stepped region and the second stepped region however additional strength is provided in that a third outer wall 78 has been applied to the corrugations. In addition to the cut-out area 17, a second cut-out of the third wall, namely the outer wall, is provided to expose the male connector 18. The structure of FIGS. 4 through 6 provides additional strength while still allowing for the after installation movement of the male/female connection if required.

FIGS. 7, 8, and 9 show a further embodiment where the cuff 19 defined by second stepped region of the female connector 14 is of a single wall thickness as the inner wall is removed in area 21 as shown in FIG. 8. Again, this structure provides for limited after installation movement of the pipe sections inwardly or outwardly from each other.

The corrugated pipe sections of FIGS. 1 through 9 are shown with a male/female connection where the outer surface of the female connector is at the same radial position as the outer wall of the corrugated pipe. This is desirable as the pipe can be installed in a trench having a consistent depth. It is possible to use a bell mouth and spigot type connection where the female connector is somewhat larger than the outer diameter of the pipe (see FIGS. 10 to 12). The advantages of a high strength coupling and/or the coupling connection being tolerant of limited inward or outward movement is also effective with the bell mouth connector and in some applications this type of connector may be preferred. Additional size may also allow for additional design strength of the connection if required.

The sectional view of FIG. 10 shows the extruder 100 having die outlets 102 and 104 used to extrude envelopes of plastic 106 and 108 used to form an outer corrugated wall and an inner smooth wall 151 of the double wall corrugated pipe. The series of mold blocks 120 define the outer corrugated wall 153 of the double wall corrugated pipe. The second envelope of plastic 108 forms the inner wall of the double wall corrugated pipe and is in engagement on the interior surface with the sizing die 122 that may also be a cooling die.

During the forming of the long corrugated pipe sections, the mold blocks passing the die outlets 106 and 108 will be of the type shown as 130 and 132 where the outer corrugations of the corrugated pipe are consistent and a smooth inner tubular wall of the double wall corrugated pipe is formed. Mold blocks 123, 124, 126 and 128 essentially define the configuration of the male/female connection.

Mold block 132 in the embodiment of FIG. 10 forms corrugations of the pipe section immediately adjacent a formed elongate spigot 170 of the male connector. Mold blocks 123 and 132 form the male portion of the pipe connection and the two envelopes of plastic 106 and 108 merge to form the elongate spigot of the male connection. The corrugations of mold block 132 are immediately adjacent and connected to the elongate spigot being formed in mold block 123.

In contrast to the male/female connection shown in FIGS. 1 through 9, the cuff portion of the female connector produced by the apparatus of FIG. 10 is slightly larger than the maximum diameter of the corrugations of the pipe sections defined by mold block 132. In this way, the normal size corrugations of the pipe section are of a size to be received in the cuff portion of the female connector as shown in FIG. 12. This configuration has the advantage that a cut section of corrugated pipe without an elongate spigot can be inserted in the cuff portion or connect with the cuff portion. This connection is not as effective but may be advantageous in certain circumstances. In the embodiment of FIGS. 10 through 12 it can be seen that the cuff portion is of slightly greater diameter than the corrugations of the pipe sections.

It is possible to have a number of corrugations associated with the elongate spigot of slightly reduced diameter and the cuff can then be of the same diameter as the corrugated pipe. Such a connection as shown in FIGS. 1 through 9 is referred to as an in-line connection. Such an inline connector of the cuff is not able to directly receive the larger corrugations located between the male connector and female connector of a pipe section.

Returning to FIG. 10, it can be seen that the mold block 128 in combination with a portion of mold block 126, has inwardly projecting land portions 150 and 152 that are offset from the sizing die 122. This arrangement allows the stepped recess 160 of the female connector to be formed between the inner wall and the sizing die. As shown in FIG. 12, area 160 is of a size to accommodate and engage the male elongate spigot 170 shown in the male/female connection 140 of FIG. 12.

Mold blocks 126 and 124 are configured to form the cuff 180 which in this embodiment is of a double layer thickness, namely the envelope of plastic 106 has been applied to the mold blocks as well as the envelope 108 has been applied to layer 106 to form the double thickness. Part of the pipe formed between mold blocks 124 and 123 will be cut and removed as illustrated at 192 in FIG. 11. In this way the female connector will be at the end of one pipe section and the male elongate spigot will be at the end of the trailing pipe section.

With the male/female connection 140 of FIG. 12, it can be seen that the elongate spigot 170 has been inserted into the female connector 194 which is defined by the cuff 196 and the stepped receiving socket 198. The leading corrugations 200, 202 and 204 that are immediately adjacent the elongate spigot 170 are received within the cuff 196 and a seal 206 is in engagement with a valley between corrugations 200 and 202 and the seal also engages an inside surface of the cuff 196. With this arrangement, there is a cavity 210 in front of corrugation 200 and this cavity is limited by wall 212 of the female connector 194. This cavity 210 allows for further movement of pipe section 225 into the female connector 194 of pipe section 227. Similarly, there is a gap immediately in front of the lead edge of the elongate spigot 170 defining a space 160 that accommodates further movement of the spigot into the female connector.

The cuff 196 not only provides a seal with the corrugations of pipe section 225, in cooperation with the elongate spigot 170 it also serves to protect the cavity 210 and in this way debris or contamination will not build or accumulate in this cavity. With the connection as shown in FIG. 12 pipe section 225 may move further into the female connector a certain distance before striking the transitional wall 212. In addition, due to the substantial length of the elongate spigot 170, pipe section 225 can be partially withdrawn from the female connector while still maintaining the spigot in the receiving cavity 160 with a number of corrugations of pipe section 225 still in engagement with the cuff 196. Preferably there is a range of movement from the centered position of the male connector and the female connector that accommodates a range of movement. The range of movement is a design variable that affects the parameters of the male and female connectors. Ranges of movement in the order of 90 mm to 150 mm are often satisfactory. In some applications a range of movement of 100 mm or a range of movement only in one direction is appropriate.

With the present invention the male and female connectors are configured to accommodate a desired range of movement while maintaining a satisfactory connection throughout the range.

In the end positions of this range of movement the elongate spigot still overlaps with the receiving cavity of the female connector and one or more corrugations associated with the male connector are still in engagement with the cuff or overlap with the cuff. Thus the cuff serves to protect the corrugations beneath it and avoids contamination in the male/female connection.

FIGS. 13, 14 and 15 show a preferred two stage male/female connector as it is formed as part of a continuous length of corrugated pipe shown as 302. This continuous length of corrugated pipe will be cut such that the transition piece 319 is removed forming a long corrugated pipe section 304 to one side and a long corrugated pipe section 305 to the other side. Corrugated pipe section 305 includes the two stage male connector 318 and corrugated pipe section 304 includes the female two stage connector 314. Each of the corrugated pipe sections 304 and 305 intermediate the male/female connectors include a series of corrugations forming the outer corrugated wall 308 having an associated smooth inner wall 306 that closes the corrugations on one side. The smooth inner wall 306 forms a flow through pipe section or inner pipe section extending in the length of the long corrugated pipe sections.

In FIG. 14 it can be seen that the male connector 318 has been fully inserted in the female connector 314. The male connector includes a first spigot portion 320 and a second spigot portion 322. The first spigot portion 320 is a thin wall extension and forms a continuation of the smooth inner wall 306 when this spigot portion is fully inserted in the female connector. This first spigot portion in combination with the inner cuff portion 334 of the female connector forms a first stage of the male/female connector with a mating circular portion coaxial with a centerline of the pipe section. In this embodiment the relatively thin wall of the first spigot portion 320 is reinforced to the exterior thereof by the corrugated and higher strength inner cuff portion 334. The first spigot portion 320 is received within the smaller cavity 336 defined interior to the inner cuff portion 334. With this arrangement as shown in FIG. 14, the inner wall 306 of the reinforced plastic pipe essentially continues with water or fluid preferably passing from the corrugated section 305 through the male connector with the first spigot portion 320 in abutment with the inner wall 306 at the inner cuff portion of the corrugated pipe section 304.

The second spigot portion 322 of the male connector is shown having three smaller diameter corrugations 350, 352 and 354. These corrugations also merge with the inner wall 306 and the corrugations effectively reinforce this portion of the inner wall 306. The first two corrugations 350 and 352 have been provided with a central recess 360 which will receive a circular resilient ceiling member. It is preferred that the second spigot portion 322 provides the effective seal with the female connector 314 and in particular with the first cuff portion (or outer cuff portion) 330. The second spigot portion 322 as shown in FIG. 14 is fully received in the outer cavity 332 of the female collector. The outer surface of corrugations 350, 352 and 354 (or the seals thereof) engage the first cuff portion 330 having a cylindrical cavity generally coaxial with a longitudinal axis of the pipe. Both the first stage and the second stage have an insert and sleeve arrangement located at different offset distances from the centerline of the male/female connector.

In reviewing FIG. 14 it can be seen that the male connector 318 includes the first spigot portion 320 which cooperates with the reinforced inner cuff portion 334 of the female connector to contribute to the strength of the male/female connection and to also provide a smooth transition through the male/female connector with respect to the smooth inner wall 306 of the reinforced plastic pipe. The particular interface between the first spigot portion and the inner cuff portion is in close proximity to the diameter of the smooth inner wall 306 and in fact is stepped outwardly therefrom by the thickness of the first spigot portion. The second stage of the male/female connection is defined by the second spigot portion 322 and its cooperation with the first cuff portion 330. In this case the outer cuff portion 330, although having some outer reinforcing small corrugations, has a relatively thin wall whereas the second spigot portion includes the corrugations 350, 352, 354 and as such has a thicker wall section. With this arrangement it can be seen that the collective strength of the male/female connector is spread between two different stages and each of these stages have an appreciable length and in fact allow for a satisfactory male/female connection to be maintained even when the male connector is partially withdrawn from the female connector as shown in FIG. 15. It is preferred to having the sealing members cooperate with the first cuff portion.

In FIG. 15 it can be seen that the first spigot portion 320 is not fully inserted and is spaced from the inner wall 306 of the corrugated pipe section 304. A shallow recess 340 exists between the end of the first spigot portion 320 and the step 342 that joins the inner cuff portion to the smooth inner wall 306.

The connection as shown in FIG. 15 still provides an effective connection of the reinforced plastic pipe 304 to reinforced plastic pipe 305 due to the extent that the male connector continues to overlap with the female connector in both the first stage and the second stage of the connection.

It has been found that by extending the male/female connection to increase the amount of overlap and providing two separate stages at different spacings from the center line of the corrugated pipe sections, that good mechanical strength can be maintained while maintaining satisfactory flow characteristics through the connected pipes. From a review of FIG. 15, it can be seen that the first spigot portion 320, although separated from the inner wall 306, only creates the shallow cavity 342 such that flow can continue across the male/female connection and this shallow recess is not particularly prone to accumulation of material which can lead to effective blockage of the connected pipes. It can also be seen that the sealing of the male connector to the female connector occurs in the second stage and is not part of the first spigot portion. In this way the first spigot portion can have a relatively thin walled section and provide the desirable features described above.

The sectional view of FIG. 16 is very similar to embodiments of FIGS. 13 through 15 however in this case the second spigot portion of the male connector is defined by the lead corrugations 370, 372, 374 of the pipe section 305 and as such the first cuff portion 330 is now of a diameter slightly larger than the diameter of the corrugations of the reinforced plastic pipe. With this arrangement it may be necessary when laying the pipe in the field to accommodate in the trench an additional depth to accommodate the additional diameter of the first cuff portion 330.

FIG. 16 has not specifically shown any sealing members, however circumferential sealing members can be provided in the recesses between the corrugations 370, 372, 374 and/or those corrugations could include recesses in the top portions thereof to receive sealing members as described with respect to FIG. 15.

The embodiments described with respect to FIGS. 1 through 16 illustrate corrugated pipe sections with a smooth inner wall defining a flow-through type pipe. FIGS. 18 through 20 show the preferred male/female connector as used in association with a reinforced rib pipe.

FIGS. 17 through 20 illustrate the particular male/female connector of the earlier Figures adapted for use in association with a reinforced plastic pipe of a ribbed construction. In contrast to reinforced corrugated plastic pipe, the individual reinforcing ribs of a rib pipe are solid and typically the spacing between the individual ribs is somewhat closer.

As shown in FIG. 17, a continuous length of rib pipe 402 is shown with rib pipe section 404 connected to rib pipe section 405 by the transition piece 419 that will be cut and removed as part of a final step of the pipe forming process. Rib pipe section 404 includes the female connector 414 and rib pipe section 405 includes the male connector 418. The male connector 418 includes the first spigot portion 420 and the second spigot portion 422. The first spigot portion 420 is relatively thin and is designed to cooperate with the smooth inner wall 406 of the ribbed pipe.

The female connector 414 includes a first cuff portion 430 that defines an outer cavity 432. The female connector includes the inner cuff portion 434 which defines the smaller cavity 436.

It can be seen that the inner cuff portion 434 includes a series of shorter length reinforcing ribs 438 such that the inner cuff portion 434 is relatively strong. The inner cuff portion 434 is sized to receive the first spigot portion 420 that may include very shallow reinforcing ribs 439. The first cuff portion 430 defines the larger diameter outer cavity 432 and the first cuff portion preferably includes small reinforcing ribs 441. The first cuff portion 430 typically is not as strong as the inner cuff portion 434.

The second spigot portion 422 includes outwardly extending reinforcing ribs 443 to provide a relatively high strength second spigot portion that is received in the first cuff portion 430 of the female connector. FIG. 18 shows the preferred arrangement where the outer cavity 432 including any reinforcing on the exterior thereof is of the same effective maximum diameter of the ribbed pipe. This type of arrangement simplifies the installation of connected pipes as the male/female connector is of the same diameter as the ribbed pipe.

FIG. 18 shows the male connector fully received in the female connector 414. A seal member 470 is provided on the second spigot portion 422 and seals with the first cuff portion 430. As can be appreciated from FIG. 18, the first spigot portion cooperates with the higher strength inner cuff portion 434 on one side of the connected male/female connection and the second spigot portion 422 is received in the first cuff portion 430 that forms a second stage of the male/female connection. A seal 470 is associated with the second stage of the connection.

When the male/female connection is fully inserted as shown in FIG. 18, the first spigot portion 420 essentially forms a continuation of the inner wall 406.

If the male/female connector is not fully inserted during the initial installation or as a result of a site condition that may occur after installation, the male/female connection can still maintain a satisfactory connection even with partial withdrawal as shown in FIG. 19. With a partial withdrawal of the male connector, the first spigot portion 420 does include the shallow recess 480 between a lead edge of the first spigot portion and the inner wall 406 of the ribbed pipe section 404. The recess 480 is quite shallow relative to the recess 482 that is created between the lead edge of the second spigot portion 422 and the junction of the first cuff portion and the inner cuff portion. Fortunately this recess 482 is not at the face of the smooth inner wall 406 and is essentially closed to the interior of the pipe such that it does not have a tendency to accumulate debris. Any debris that might occur has to find lodging in the shallow recess 480 which is less likely. It has also been found that the partial withdrawal of the male connector due to the length of the two stages can still provide effective mechanical connection of the two components. It has also been found that the two stage connection and the significant length of each stage also reduces the deflection that might occur at the male/female connection which would tend to open up the first cuff portion.

FIG. 20 shows two long rib pipe sections 404 and 405 where the first cuff 430a of the female connector is slightly larger than the maximum outer diameter of the rib pipe and includes compressible wiper type seal 470a. This is a common type connection and can use the two stage male/female connection as described in FIGS. 17 through 19 as modified to slightly increase the size of the first cuff portion.

The two stage male/female connection as used for corrugated pipe and rib pipe does extend the length of the male/female connector however it provides the advantage of a satisfactory connection even if the male connector is not fully inserted at the time of installation or is partially withdrawn due to site conditions that may occur after the pipe has been installed. This particular two stage design also has advantages at the junction of the first spigot portion and the inner wall of the reinforced plastic pipe and it forms a good transition even with partial withdrawal of the spigot from the female connector. Due to the thin wall section of the first spigot portion, any recess created by partial withdrawal is very shallow and is less prone to accumulation of debris in this recess. Other single stage designs create a fairly large cavity which does have a tendency to accumulate debris and once debris starts to accumulate it continues to grow and can significantly affect the flow characteristics through the male/female connection and may lead to a significant restriction of the interior space of the pipe.

The present description has been of a reinforced plastic pipe of a circular cross-section but other shapes can also use the two-stage connector such as an oval cross-section as one example.

The present invention is also directed to a pipe corrugator having a series of opposed mold blocks for producing reinforced corrugated pipe as disclosed in this application.

Although various preferred embodiments of the present invention have been described herein in detail, it will be appreciated by those skilled in the art that variations may be made thereto without departing from the appended claims.

The embodiments of the invention in which an exclusive property or privilege is claimed are defined as follows:

1. A reinforced plastic pipe having a smooth inner wall reinforced by an outer wall having a series of outwardly extending reinforcing portions where said outer wall reinforces and increases the strength of said inner wall;

a male/female connector with one end of said reinforced plastic pipe having a two stage male connector and an opposite end of said reinforced plastic pipe having a two stage female connector sized to receive a male connector of the same construction as said two stage male connector;

said male connector including a first spigot portion with said inner wall having a first diameter and the outer wall having a diameter less than an outer diameter of said female connector;

said male connector further including a second spigot portion having an inner diameter the same as said first spigot portion and the plurality of spaced outwardly extending reinforcing members separated by inwardly extending recesses; and wherein said female connector at a free end thereof includes a first cuff portion with the inner wall defining an outer connecting cavity sized to receive and engage said second spigot portion and an inner cuff portion defining a smaller in diameter tubular cavity merging with said outer connecting cavity and said inner cuff portion being of a size to receive and closely sleeve said first spigot portion, and wherein said smooth inner wall runs from a free end of said male connector to said free end of said female connector.

2. The reinforced plastic pipe as claimed in claim 1, wherein said first spigot portion is of reduced stiffness relative to said second spigot portion.

3. The reinforced plastic pipe as claimed in claim 2, wherein said first cuff portion is of reduced stiffness relative to said inner cuff portion.

4. The reinforced plastic pipe as claimed in claim 2, wherein a coupling formed by insertion of said male connector in said female connector forms a section of pipe having a stiffness greater than the stiffness of said pipe intermediate the male and female connectors.

5. The reinforced plastic pipe as claimed in claim 4, wherein said series of outwardly extending reinforcing portions includes a series of outwardly extending reinforcing corrugations or outwardly extending reinforcing ribs.

6. The reinforced plastic pipe as claimed in claim 2, wherein said reinforced plastic pipe is a corrugated reinforced plastic pipe with a series of spaced reinforcing corrugations selectively connected to said inner wall; and wherein said first spigot portion is of a length at least equal to a length of said reinforced plastic pipe necessary to fully include two adjacent corrugations.

7. The reinforced plastic pipe as claimed in claim 1, wherein the outer diameter of said female connector is the same as the outer diameter of the rest of said reinforced pipe.

8. The reinforced plastic pipe as claimed in claim 1, wherein said first spigot portion and said second cuff portion cooperate along the length thereof to form a sleeve arrangement generally extending the extent of overlap therebetween and said second spigot portion and said first cuff portion form a sleeve arrangement determined by the extent of overlap thereof; and wherein said sleeve arrangements are each effective without full insertion of said male connector in said female connector.

9. The reinforced plastic pipe as claimed in claim 1, wherein said first spigot section is of a generally constant wall thickness approximately equal to the greatest wall thickness of said inner wall between said outwardly extending reinforcing portions.

10. The reinforced plastic pipe as claimed in claim 1, wherein said two stage male connector cooperates with said two stage female connector to provide two spaced overlapped sleeve connecting segments of different diameters with a first sleeve connecting segment defined by the extent of overlap of said first spigot portion with said second cuff portion and a second sleeve connecting segment defined by the extent of overlap of said second spigot portion and said first cuff portion.

11. The reinforced plastic pipe as claimed in claim 10, wherein said inner cuff portion includes a series of outwardly extending reinforcing ribs and/or reinforcing corrugations of a diameter equal to or less than said second diameter.

12. A reinforced plastic pipe having an inner pipe section of a first inner diameter reinforced by a series of outwardly extending reinforcing portions of a second greater diameter that reinforce and increase the strength of said inner pipe section, wherein said reinforced plastic pipe is a corrugated reinforced plastic pipe with a series of spaced reinforcing corrugations selectively connected to said inner pipe section;

a male/female connector with one end of said reinforced plastic pipe having a two stage male connector and an opposite end of said reinforced plastic pipe having a two stage female connector sized to receive a male connector of the same construction as said two stage male connector;

said male connector including a first spigot portion with an inner wall of said first diameter and an outer wall section of a diameter less than an outer diameter of said female connector, said first spigot portion is of a length at least equal to a length of said reinforced plastic pipe necessary to fully include two adjacent corrugations;

said male connector further including a second spigot portion having an inner diameter the same as said first spigot portion and a plurality of spaced outwardly extending reinforcing members separated by inwardly extending recesses, said second spigot portion is of a length at least equal to a length of said reinforced plastic pipe that fully includes three adjacent corrugations; and said female connector at a free end thereof includes a first cuff portion with an inner wall defining an outer connecting cavity sized to receive and engage said second spigot portion and an inner cuff portion defining a smaller in diameter tubular cavity merging with said outer cavity and said inner cuff portion being of a size to receive and closely sleeve said first spigot portion, and wherein said first spigot portion is of reduced stiffness relative to said second spigot portion.

13. The reinforced plastic pipe as claimed in claim 12, wherein a first step is defined between said first spigot portion and a lead corrugation of said second spigot portion and a second step is defined between an inner corrugation of said second spigot portion and an adjacent larger diameter corrugation of said reinforced plastic pipe.

14. A reinforced plastic pipe comprising:
two extruded layers forming a generally smooth inner tubular wall and a corrugated or ribbed outer wall that reinforces and increases a strength of said pipe;
a male connector having a first spigot portion and a second spigot portion having an outer diameter greater than an outer diameter of said first spigot portion, said second spigot portion having a plurality of corrugations; and
a female connector having an inner cuff portion and an outer cuff portion having an inner diameter greater than an inner diameter of said inner cuff portion, said inner cuff portion configured to receive and engage said first spigot portion and said outer cuff portion configured to allow said first spigot portion to pass through to said inner cuff portion and to receive and engage said second spigot portion, and
wherein said outer diameter of said first spigot portion is approximate to the inner diameter of said inner cuff portion, and
said outer diameter of said second spigot portion is approximate to the inner diameter of said outer cuff portion, and
said smooth inner tubular wall runs a length of said pipe including an entire length of said female connector such that an inner diameter of said smooth inner wall increases or remains the same from a start of said inner cuff portion to said free end of said female connector.

15. The reinforced plastic pipe as claimed in claim 14, wherein
- said corrugations of said female connector have the same outer second diameters although a corrugation height on said inner cuff portion is greater than a corrugation height on said outer cuff portion; and
- said first spigot portion having a plurality of corrugations.

16. The reinforced plastic pipe as claimed in claim 14, wherein after assembly there is a shallow recess between a free end of said first spigot portion and said start of said inner cuff portion,
- after assembly said male connector may move relative to said female connector while providing overlap between said connectors and providing a relative uniform inner wall diameter.

* * * * *